United States Patent
Hymer et al.

(10) Patent No.: US 6,652,676 B1
(45) Date of Patent: Nov. 25, 2003

(54) ZINC ALLOY CONTAINING A BISMUTH-INDIUM INTERMETALLIC COMPOUND FOR USE IN ALKALINE BATTERIES

(75) Inventors: Timothy R. Hymer, Villa Ridge, MO (US); Stephen E. James, O'Fallon, IL (US)

(73) Assignee: Big River Zinc Corporation, Sauget, IL (US)

( * ) Notice: Subject to any disclaimer, the term of this patent is extended or adjusted under 35 U.S.C. 154(b) by 0 days.

(21) Appl. No.: 09/420,018

(22) Filed: Oct. 18, 1999

(51) Int. Cl.$^7$ .............................................. C22C 18/00
(52) U.S. Cl. ...................... 148/441; 420/513; 429/209; 429/229
(58) Field of Search .................. 148/441; 420/513; 429/209, 229

(56) References Cited

U.S. PATENT DOCUMENTS

| | | | |
|---|---|---|---|
| 4,632,890 A | 12/1986 | Wang | 429/218 |
| 4,994,333 A | 2/1991 | Jose et al. | 429/190 |
| 5,082,622 A | 1/1992 | Meeus et al. | 420/514 |
| 5,108,494 A | 4/1992 | Uemura et al. | 75/347 |
| 5,198,315 A | 3/1993 | Tada et al. | 429/209 |
| 5,240,793 A | 8/1993 | Glaeser | 429/206 |
| 5,376,480 A | 12/1994 | Shinoda et al. | 429/206 |
| 5,384,214 A | 1/1995 | Sugihara et al. | 429/206 |
| 5,425,798 A | 6/1995 | Sasaki et al. | 75/347 |
| 5,639,578 A | 6/1997 | Urry | 429/229 |
| 6,428,932 B1 | 8/2002 | Shinoda et al. | 429/229 |

FOREIGN PATENT DOCUMENTS

| | | |
|---|---|---|
| EP | 1 054 070 A1 | 11/2000 |
| JP | H4-368776 | 12/1992 |
| JP | 5182660 | * 7/1993 |
| JP | H5-182661 | 7/1993 |
| JP | 6302323 | * 10/1994 |
| JP | 7153449 | * 6/1995 |
| JP | 08022822 | * 1/1996 |
| JP | H9-055207 | 2/1997 |
| JP | H9-259877 | 10/1997 |
| WO | 9607765 | * 3/1996 |

OTHER PUBLICATIONS

*Battery Reference Book*, 2nd Edition, Crompton, T.R., Ed., Chap. 6, pp. 6–1 through 6–5, Butterworth–Heinemann, Jordan Hill, OXford, UK (1995).

Zhang, X.G., *Corrosion and Electrochemistry of Zinc*, Chap 13, pp. 373–391, Plenum Press, New York (1996).

* cited by examiner

*Primary Examiner*—Sikyin Ip
(74) *Attorney, Agent, or Firm*—Harness, Dickey & Pierce, P.L.C.

(57) ABSTRACT

A zinc alloy for use in zinc-alkaline batteries having improved gassing properties includes a bismuth-indium intermetallic compound in an amount sufficient to improve the gassing properties of the alloy, and with the major part of the alloy being zinc that is substantially free of lead and mercury. The bismuth-indium intermetallic is preferably present in the form of segregates located at the intergrain boundaries. The bismuth and indium are preferably present in an amount between 50 and 10,000 ppm, and more preferably 200 to about 1000 ppm, and most preferably about 300 ppm. The weight ratio of bismuth to indium is preferably from about 46:54 to about 50:50, and more preferably about 48:52. Magnesium, calcium and aluminum may also be present.

36 Claims, 6 Drawing Sheets

ZINC ALLOY CONTAINING A BISMUTH-INDIUM INTERMETALLIC COMPOUND FOR USE IN ALKALINE BATTERIES

BACKGROUND OF THE INVENTION

1. Field of the Invention

The present invention relates to a zinc alloy that is substantially free of lead and mercury for use in alkaline batteries and methods for its preparation and use, and more particularly to a zinc alloy that is substantially free of lead and mercury and that contains bismuth and indium and provides improved gassing properties in alkaline batteries and methods for its preparation and use.

2. Description of the Related Art

Alkaline batteries are well known in the art and have been described generally in *Battery Reference Book*, 2nd Edition, Crompton, T. R., Ed., Chap. 6, pp. 6–1 through 6–5, Butterworth-Heinemann, Jordan Hill, Oxford, UK (1995); and Zhang, X. G., *Corrosion and Electrochemistry of Zinc*, Chap. 13, pp. 373–391, Plenum Press, New York (1996). The conventional alkaline battery is composed of a cathode, an anode and other components of an electrochemical cell that generate an electric current when the circuit between the cathode and anode is closed. One typical construction is a cup-shaped manganese oxide cathode that forms an outer case for the battery. The inside of the cathode is lined with a paper separator that separates the cathode from a highly alkaline paste or gel anode, but permits electric current exchange with the anode. The anode is commonly made up with zinc powder that has been mixed with a gelling agent in a highly alkaline medium and possibly with other components that are found to be desirable by the battery manufacturer. It is common for the anode to be pierced by a central brass collector pin that serves as the contact for the anode with the external circuit.

Since alkaline batteries of this type are commonly used in computers and other instruments that have electrical contacts and other components that would be harmed by contact with the highly alkaline paste of the battery, and also because such batteries often are handled by persons during installation in flashlights, toys and the like, it is important to prevent any leakage of the alkaline contents of the battery. To prevent leakage, these batteries are commonly sealed.

A common and vexing problem experienced in early sealed alkaline batteries was the generation of gas inside the battery. Such gas generation is believed to be caused in batteries during storage and also during discharge by spontaneous corrosion of the zinc with the resulting generation of hydrogen gas. This gas generation in a sealed battery was found to cause bulging of the case and even to break the seal and allow undesirable leakage of the highly alkaline paste from the battery case.

Early attempts to solve the gassing problem of zinc alkaline batteries revealed that the addition of mercury to the zinc powder substantially reduced the gas generation rate. The presence of lead also seemed to improve gassing properties. As used herein, when it is said that gassing properties of a zinc powder are improved, it is meant that a unit amount of the zinc powder, with the improvement evolves less gas per unit time than the same amount of zinc powder without the improvement when each is exposed to the same environment—such environment being similar to that found inside an alkaline battery.

More recently, however, both lead and mercury have been found to have undesirable environmental consequences and recent efforts have been directed to find alternative ways to improve the gassing properties of zinc powders in zinc alkaline batteries without the use of either lead or mercury. The use of mercury has been discontinued, for all intents and purposes, and the present objective is to find a way to discontinue the use of lead as well.

It has been found that such metals as cadmium, indium, bismuth and others provided a high hydrogen overpotential and reduced gassing when they were added alone, or in combination, to zinc powders. The addition of indium and/or bismuth and magnesium and/or lithium to a zinc anode was disclosed in U.S. Pat. No. 4,994,333. The addition of the metals was reported to suppress zinc corrosion and to improve the mechanical tensile strength of the anode. In U.S. Pat. No. 5,240,793, the addition of indium and bismuth to a zinc powder was reported to provide an alkaline battery with low hydrogen gas evolution. Sugihara et al., in U.S. Pat. No. 5,384,214, reported that addition of yttrium hydroxide prepared in a certain manner to the alkaline electrolyte that was in contact with a zinc alloy electrode inhibited corrosion of the zinc when the zinc alloy contained at least one metal selected from bismuth, lithium, calcium and aluminum and was free of mercury, lead, cadmium, indium and thallium. In Japanese patent application Kokai H9-055207, Ninakata et al. report that an alkaline battery having a zinc alloy powder negative electrode provides controlled gas generation without the use of mercury or lead when the zinc alloy contains certain amounts of indium, aluminum, bismuth, magnesium; an additional indium compound—such as indium oxide; and at least one element selected from lithium, potassium and calcium.

Another zinc-based electrode material that is free of mercury, cadmium and lead was reported by Yasumura et al. in Japanese patent application Kokai H9-259877, where it was disclosed that the zinc-based alloy must contain certain amounts of oxygen, indium, bismuth and aluminum; certain amounts of oxygen, indium, bismuth and magnesium; or certain amounts of oxygen, indium and nickel. It was reported that batteries made with the claimed zinc-based electrode alloys had improved self discharge and load discharge capacities.

Murajima et al., in Japanese patent application Kokai H4-368776 reported a mercury-free zinc alloy powder that was capable of controlling hydrogen generation and of improving battery properties at low temperatures. The zinc alloy included a certain amount of at least one metal selected from aluminum, gallium, indium, thallium, magnesium, calcium, strontium, tin, lead, bismuth, cadmium, silver, tellurium, copper, nickel, barium and germanium.

In Japanese patent application Kokai H5-182661, Murashima et al. disclose a zinc alloy powder with no added mercury or lead that consisted of zinc with certain amounts of at least one type of metal selected from lead, indium, bismuth, aluminum and calcium.

Despite the promising work that has recently been reported in this field, however, a need still remains for an alkaline cell electrode material that is substantially free of both lead and mercury and that provides gassing properties that are improved over pure zinc metal. It would be particularly useful if the gassing properties of the electrode material were at least comparable with the gassing properties of presently commercial lead-containing zinc electrode powder.

Although the gas generation properties of various electrode materials has been the major focus of much of the work directed at the improvement of these materials, the discharge capacity of batteries that use the materials is also important to the ultimate performance of the battery. Thus, it would be even more useful if an electrode material that is substantially free of both lead and mercury and that had improved gassing properties would also provide a battery having a discharge capacity that was at least comparable to a battery that uses a presently commercial lead-containing zinc electrode powder.

BRIEF SUMMARY OF THE INVENTION

Briefly, therefore, the present invention is directed to a novel zinc alloy for use in batteries and having improved gassing properties, the alloy comprising a bismuth-indium (BiIn) intermetallic compound in an amount sufficient to improve the gassing properties of the alloy; and with the major part of the alloy being zinc that is substantially free of lead and mercury.

The present invention is also directed to a novel method for preparing a zinc alloy for use in alkaline batteries having improved gassing properties, the method comprising mixing together into a molten mixture, bismuth and indium in a weight ratio of from about 40/60 to about 70/30; and with the major part being zinc that is substantially free of lead and mercury; and solidifying the molten mixture under conditions so that at least some of the bismuth and indium form a bismuth-indium (BiIn) intermetallic compound in an amount sufficient to improve the gassing properties of the alloy.

The present invention is also directed to a novel battery of the type having an anode of zinc alloy, wherein the zinc alloy comprises bismuth and indium in a BiIn intermetallic compound; and with the major part being zinc that is substantially free of lead and mercury.

The present invention is also directed to a novel method for making a battery having an anode that is substantially free of lead and mercury and has low gassing, said method comprising preparing an anode from zinc alloy that comprises bismuth and indium in a BiIn intermetallic compound and with the major part being zinc that is substantially free of lead and mercury; and using the anode to form a battery.

Among the several advantages found to be achieved by the present invention, therefore, may be noted the provision of an alkaline cell electrode material that is substantially free of both lead and mercury; the provision of such an electrode material that provides gassing properties that are improved over pure zinc metal; the provision of such an electrode material having gassing properties that are at least comparable with the gassing properties of presently commercial lead-containing zinc electrode powder; and the provision of such an alkaline cell electrode material that provides a battery having a discharge capacity that is at least comparable to a battery that uses a presently commercial lead-containing zinc electrode powder.

DETAILED DESCRIPTION OF THE PREFERRED EMBODIMENTS

In accordance with the present invention, it has been discovered that a novel zinc alloy that contains bismuth and indium in the form of a bismuth-indium (BiIn) intermetallic compound (as those terms are defined below) provides a resistance to gas formation in an environment analogous to that experienced by an electrode in an alkaline battery that is unexpectedly superior to pure zinc and to known zinc alloys. The novel alloy can be formed into a powder that is substantially free of both lead and mercury, which powder can advantageously be used as an electrode—in particular as the anode—in a typical alkaline battery.

It is preferred that the BiIn intermetallic compound is present in the novel zinc alloy in the form of segregates (which will be defined below). It is also preferred that the novel zinc alloy has intergrain boundaries between zinc crystalline regions and that at least some—and preferably a predominant amount—of the BiIn intermetallic segregates are located at the zinc intergrain boundaries. Without wishing to be bound by this or any other theory, the inventors believe that the presence of the BiIn intermetallic compound segregates, and in particular, presence of the segregates at the zinc intergrain boundaries, is related to the superior properties of the novel alloy.

The subject alloy has been found to provide gassing properties that are actually superior to commercial lead-containing zinc electrode powder. And, surprisingly, it has also been found that the novel zinc alloy provides improved discharge capacity as well.

By "discharge capacity" what is meant is the time that a battery will provide a certain current flow at a given potential. For example, a battery described as having a discharge capacity of 5 min. @2000 mA to 1.0 V, for example, will provide a current flow of 2000 milliamps for 5 minutes before the voltage drops below 1.0 volt. The selection of the current and the voltage at which the test is ended are arbitrary and are selected on the basis of the design of the test cell. The utility of the measurement is obtained by constructing test cells that are the same except for varying one component of interest. For example, the effect on battery capacity of the composition of the zinc powder for a battery anode may tested by constructing test cells varying only in the zinc powder composition and measuring the discharge capacity for each of the test cells. As one would expect, longer discharge times are preferred.

Zinc metal forms the majority of the alloy of the present invention. It is preferred that the zinc is of a grade that is known as Special High Grade (SHG) zinc. Special High Grade zinc has a minimum zinc content of 99.99% by weight and contains less than 0.003% each of lead, iron and cadmium; less than 0.002% each of aluminum and copper; less than 0.001% tin; and less than 0.01% total non-zinc contaminants—all on a percent by weight basis.

It is preferred that the zinc that is used in the present invention be substantially free of lead and mercury. When it is said that the zinc is "substantially free of lead and mercury" what is meant is that the zinc has no added lead or mercury. It is preferred that zinc that is substantially free of lead have a lead content, on a weight basis, of no more than about 60 parts per million (ppm); no more than about 40 ppm of lead is more preferred; and no more than about 30 ppm of lead is most preferred. It is preferred that zinc that is substantially free of mercury have a mercury content that is essentially undetectable by methods that are currently used in the trade to measure the levels of metal contaminants of zinc.

The bismuth that is useful in the present invention can be of any purity that is sufficient to provide the advantages of the invention. It is preferred that the bismuth is of a purity that passes in the trade as bismuth metal and it is more preferred that the bismuth have a purity of 99.9% by weight bismuth. The bismuth that is useful in the novel alloy does not have to be pure and can contain contaminants that are commonly found in commercial bismuth in amounts below that at which they interfere with the provision of the advantages that are described for the novel alloy. It is preferred, however, that the bismuth is substantially free of nickel, tin, copper, iron, aluminum, antimony, lead, mercury and arsenic.

The indium that is useful in the present invention can be of any purity that is sufficient to provide the advantages of the invention. However, it is preferred that indium having a purity that passes in the trade as indium metal be used and it is more preferred that the indium have a purity of 99.9% by weight indium. The indium that is useful in the novel alloy does not have to be pure and can contain contaminants that are commonly found in commercial indium in amounts below that at which they interfere with the provision of the advantages that are described for the novel alloy. It is preferred, however, that the indium is substantially free of nickel, tin, copper, iron, aluminum, antimony, lead, mercury and arsenic.

The magnesium that is useful in the present invention can be of any purity that is sufficient to provide the advantages of the invention. It is preferred, however, that the magnesium is of a purity that passes in the trade as magnesium metal and more preferred that it be 99% by weight magnesium. The magnesium that is useful in the novel alloy does not have to be pure and can contain contaminants that are commonly found in commercial magnesium in amounts below that at which they interfere with the provision of the advantages that are described for the novel alloy. It is preferred, however, that the magnesium is substantially free of nickel, tin, copper, iron, aluminum, antimony, lead, mercury and arsenic.

The calcium that is useful in the present invention can be of any purity that is sufficient to provide the advantages of the invention. It is preferred, however, that the calcium is of a purity that passes in the trade as calcium metal and more preferred that it be 99% by weight calcium. The calcium that is useful in the novel alloy does not have to be pure and can contain contaminants that are commonly found in commercial calcium in amounts below that at which they interfere with the provision of the advantages that are described for the novel alloy. It is preferred, however, that the calcium is substantially free of nickel, tin, copper, iron, aluminum, antimony, lead, mercury and arsenic.

The aluminum that is useful in the present invention can be of any purity that is sufficient to provide the advantages of the invention. It is preferred, however, that the aluminum is of a purity that passes in the trade as aluminum metal and more preferred that it be 99% by weight aluminum. The aluminum that is useful in the novel alloy does not have to be pure and can contain contaminants that are commonly found in commercial aluminum in amounts below that at which they interfere with the provision of the advantages that are described for the novel alloy. It is preferred, however, that the aluminum is substantially free of nickel, tin, copper, iron, antimony, lead, mercury and arsenic.

The novel zinc alloy of the present invention can be prepared by methods that are conventionally used for the preparation of such metals for use as electrodes in alkaline batteries, except that the method for preparing the alloy must be controlled and/or adapted to produce a zinc alloy that has the desired characteristics that are described below. It is preferred that the method for preparing the zinc alloy be one that maximizes the relative amount of bismuth and indium that is present in the alloy in the form of a bismuth-indium (BiIn) intermetallic compound. It is more preferred that the method produces a zinc alloy that contains zinc crystallites that meet at zinc intergrain boundaries. It is yet more preferred that the method be one that maximizes the amount of the BiIn intermetallic compound that is located at the intergrain boundaries. It is yet more preferred that the method be one that maximizes the relative amount of the BiIn intermetallic compound that is $BiIn_2$.

When the terms "bismuth-indium intermetallic compound", or "BiIn intermetallic", are used herein, what is meant is a compound that contain bismuth and indium and is present in a phase that is separate from the bulk zinc phase and which phase has a characteristic relative amount of bismuth and indium, crystal structure and properties. Such intermetallics can be identified thermodynamically as compositions, usually having stoichiometric amounts of bismuth and indium, wherein small compositional deviations cause a rapid rise in Gibbs Free Energy (G). See, e.g., Easterling, K. E., and D. A. Porter, *Phase Transformations in Metals and Alloys*, Van Nostrand Reinhold, Berkshire, England (1988). As shown in the phase diagram of FIG. 1, there are three discrete BiIn intermetallic compounds: BiIn, $BiIn_2$ and $BiIn_5$. The terms "bismuth-indium intermetallic compound", or "BiIn intermetallic", as used herein, are to be understood to include one or more of these compounds and can include any two, or all three of the compounds.

When it is said that it is preferred that the method for preparing the novel alloy maximizes the amount of bismuth and indium that is present in the form of a BiIn intermetallic compound, what is meant is that it is preferred that the method results in a maximum proportion of the bismuth and indium that is present in the molten alloy being ultimately present in the solidified alloy as either BiIn, $BiIn_2$, or $Bi_3In_5$.

It is believed that the preferred type of BiIn intermetallic compound that can be present in the novel alloy is $BiIn_2$. Thus, it is preferred that the method for preparing the novel alloy be designed to maximize the relative amount of the BiIn intermetallic that is $BiIn_2$.

It is preferred that the method for preparing the novel zinc alloy be designed to result in an alloy wherein at least some of the BiIn intermetallic compounds of the present invention are present in the form of discrete particles that are imbedded in the bulk of the zinc phase. Such particles may be referred to herein as "segregates". It is more preferred that the BiIn intermetallic compounds are present predominantly in the form of such segregates, and yet more preferred that substantially all of the BiIn intermetallic compounds are present in the form of segregates. When it is said that the BiIn intermetallic compounds are present "predominantly" in the form of segregates, what is meant is that at least 50%, by weight, of the BiIn intermetallic compounds are present in such segregates. When it is said that substantially all of the BiIn intermetallic compounds are present in the form of segregates, it is meant that at least about 80%, by weight, of the BiIn intermetallic compounds are present in the form of segregates.

Figure 2:
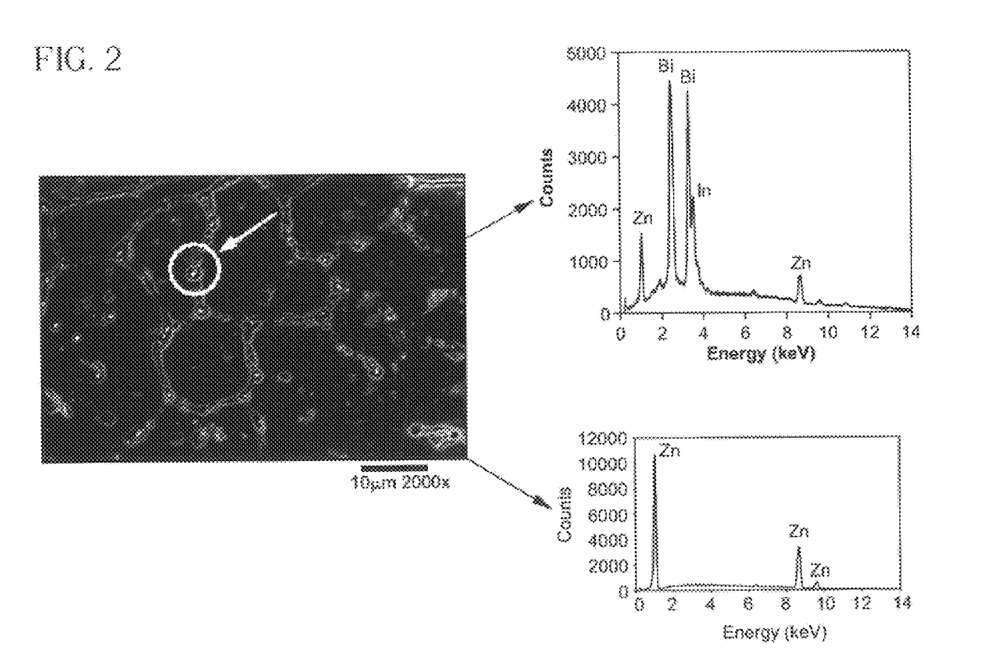
FIG. 2 is a scanning electron micrograph of a cross-section cut from a granule of a novel bismuth/indium/magnesium/zinc alloy in accordance with this invention that is shown along with the corresponding energy dispersive spectroscopy (EDS) spectra of two areas selected from the areas indicated; the photomicrograph of the alloy showing regions of zinc as discrete, roughly hexagonal crystalline grains that contact each other at intergrain boundaries and showing that bismuth-indium intermetallic segregates are concentrated at the zinc intergrain boundaries; the corresponding EDS spectra verifying the composition of the zinc and of the BiIn intermetallic compound.
Figure 3:
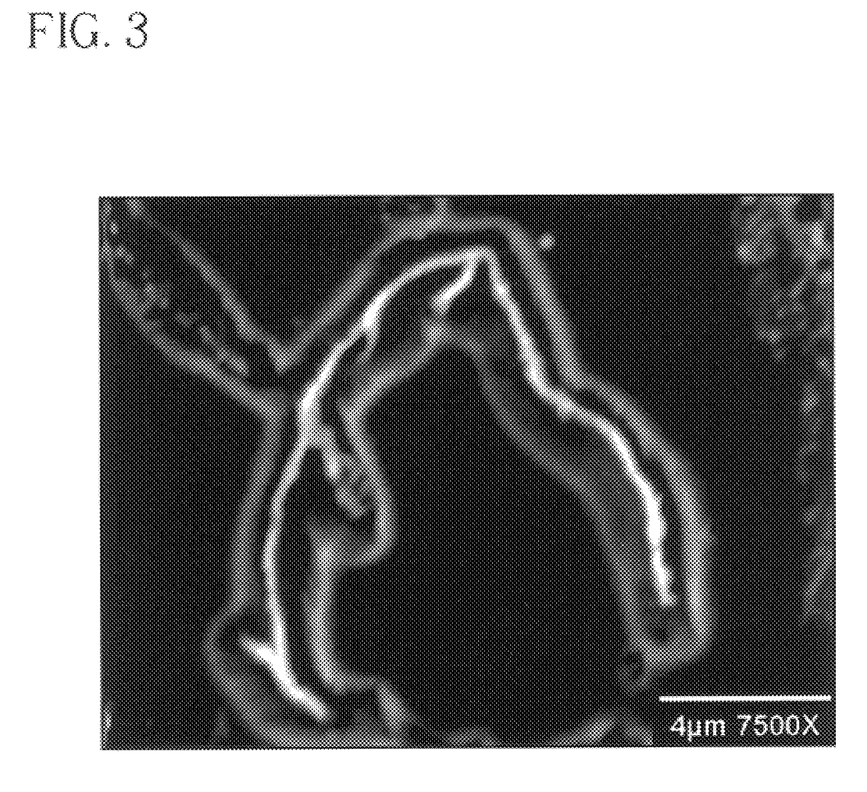
FIG. 3 is a scanning electron micrograph of a cross-section cut from a powder grain of the novel bismuth/indium/magnesium/zinc alloy that shows zinc crystalline grains as darker areas and shows concentration of the BiIn intermetallic compound at the zinc intergrain boundaries, but in a slightly different physical confirmation than that shown in FIG. 2.

When it is said that the method for preparing the novel zinc alloy maximizes the amount of the BiIn intermetallic that is located at the intergrain boundaries, what is meant is that the method results in a solid alloy having zinc crystalline regions that meet at intergrain boundaries and that a maximum proportion of the amount BiIn intermetallic segregates that are present in the alloy are located at the intergrain boundaries. FIGS. 2 through 4 illustrate this characteristic and show zinc crystalline regions having intergrain boundaries along which are located the BiIn intermetallic segregates. When it is said to be preferred that the BiIn intermetallic segregates are "predominantly" located at the zinc intergrain boundaries, what it meant is that at least about 60%, by weight, of such segregates are located at such intergrain boundaries. More preferably, at least about 75%, by weight; even more preferably about 85% by weight, and most preferably, substantially all (meaning at least about 90%, by weight) of such segregates are located at the intergrain boundaries.

Surprisingly, it has been found that a zinc alloy that is substantially free of lead and mercury provides unexpectedly superior gassing properties when used as an alkaline cell electrode when the zinc alloy contains zinc intergrain boundaries and contains the BiIn intermetallic compound at the intergrain boundaries. When it is said that the alloy contains the BiIn intermetallic compound at the intergrain boundaries, it is not meant to exclude the possibility that bismuth, indium and even other non-bismuth/indium compounds, can also be present at the intergrain boundaries.

It is believed that the novel alloy can be prepared by any one of a number of different processes and that almost any conventional process that is known in the art for the production of zinc alloy powders for use in battery anodes can be controlled and/or adapted to produce the novel alloy, provided that the process is controlled to produce the desirable characteristics that are described herein. It is believed that processing variables such as the composition of the melt; the degree of mixing of the melt; the degree of superheat of the melt prior to atomization; the type of atomization; the rates of heating and cooling of the melt; and the rate of solidification of the alloy are all parameters that have an affect on the properties of the alloy and it is believed that these variables can be controlled to produce the alloy of the present invention.

Zinc alloys having essentially the same overall composition as the subject alloy can be produced by conventional processes, but these alloys can display essentially none of the superior properties of the subject alloy. It is believed that the lack of superior properties in such alloys is caused a lack of bismuth-indium intermetallic compound and/or a lack of location of such intermetallic compounds at zinc intergrain boundaries. However, once one of skill in the art understands the importance of the presence of BiIn intermetallic compound in the alloy, it is routine to control and/or adapt a known process to produce the novel alloy by adjusting one or more of the parameters described above and measuring the BiIn intermetallic content and location parameters of the resulting alloy.

By way of example, one preferred method that can be used to produce the subject alloy is to process zinc, indium and bismuth (and other metals, such as magnesium, if they are to be used) in the preferred grade and purity as described above through the steps described below. The zinc is melted in a conventional metal alloy melting furnace, such as is commonly known and used in the trade, and the desired amounts of indium, bismuth and other metal(s) are added to the zinc. The order in which the metals are added to the melting vessel is not believed to be critical and the metals can be added in any order as long as the desired amount of each component is finally added to the melting vessel. For example, bismuth and indium can be added to the molten zinc individually, or in the form of a mixture or an alloy of the two metals.

It is believed that the amount of $BiIn_2$ intermetallic compound that is formed relative to the total amount of bismuth and indium that is present in the alloy is maximized when bismuth and indium are present in a molar ratio of about 1:2. Without wishing to be bound to this or any other theory, the inventors believe that the bismuth and indium that are present in the molten zinc alloy in about this ratio combine upon solidification to form a bismuth/indium intermetallic compound—$BiIn_2$—and that it is the presence of this compound that is related to the superior properties of the zinc alloy. Thus, it is preferred that bismuth and indium be present in the molten zinc alloy in relative amounts that provide the maximum amount of $BiIn_2$ intermetallic compound upon solidification.

Figure 1:
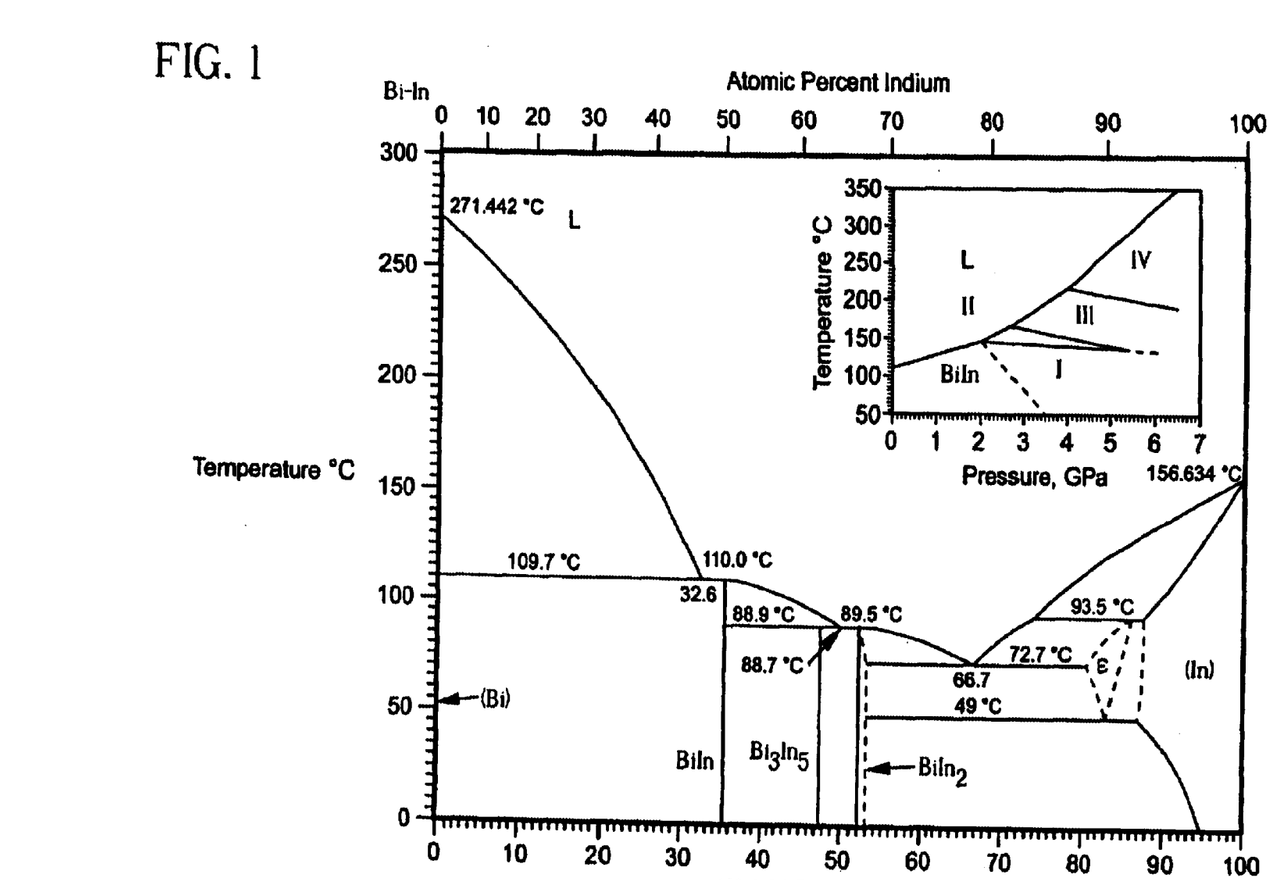
FIG. 1 is a solid/liquid phase diagram of bismuth and indium.

FIG. 1 shows a phase diagram for bismuth and indium (from ASM Handbook; *Alloy Phase Diagrams*; Hugh Baker, Ed.; Vol. 3, page 2–100; ASM International, Materials Park, Ohio (1992)). The diagram indicates that the solid $BiIn_2$ intermetallic compound solidifies from the melt at a temperature of 89.5° C. and has a composition of about 52% to 53% by weight indium and with the remainder, about 47% to 48%, of bismuth. Thus, it would be expected that a mixture of molten bismuth and indium having that same composition would form the maximum amount of the $BiIn_2$ intermetallic compound upon solidification, whereas a molten mixture having a ratio of bismuth to indium that is substantially different, could be expected to form some solid $BiIn_2$, but would also form some amount of one or more different solid compositions. It is believed that bismuth and indium act to form at least some of the $BiIn_2$ intermetallic compound even when the composition of the molten zinc alloy is so high or low in bismuth or indium as to appear to be out of the range where $BiIn_2$ should theoretically form. It is believed that this occurs due to the fact that the atomization and solidification process that is used to form zinc anode powders is not an equilibrium process, but occurs so quickly that some $BiIn_2$ can be formed even when the bismuth:indium ratio is higher or lower that the range within which $BiIn_2$ would normally be expected to form.

It is also believed that some amount of the other BiIn intermetallic compounds—BiIn and $Bi_3In_5$—are formed upon solidification of the alloy. The weight ratio of the bismuth-to-indium in these other BiIn intermetallic compounds is, respectively, about 65:35 and about 52:48. In fact, pure bismuth and/or pure indium can also form upon solidification.

Because the molecular weight of indium is about 115, and the molecular weight of bismuth is about 209, it follows that the superior properties that are provided by a bismuth to indium molar ratio of about 1:2 are provided when the bismuth and the indium are present in the novel zinc alloy in a weight ratio of about 48:52. However, the advantageous properties of the novel alloy can be obtained when the weight ratio of bismuth to indium is within a range of from about 40:60 to about 70:30; preferably from about 45:55 to about 68:32; more preferably from about 46:54 to about 65:35; even more preferably when the bismuth and indium are present in approximately equal amounts by weight; yet more preferably when the weight ratio of bismuth to indium is within a range of from about 46:54 to about 50:50; and most preferably when the weight ratio of bismuth to indium is about 48:52.

For some applications, an element selected from the group consisting of magnesium, calcium, or even aluminum (hereinafter, "trace metal"), has been found to be a desirable component of the subject alloy. It is preferred that such trace metal is present in the alloy in an amount sufficient to provide the various advantages that are described for the novel alloy, but that the trace metal not be present in an amount that results in reduced discharge capacity and/or poorer gassing properties than are achieved when it is not included at all in the alloy. It is more preferred that the trace metal is present in the alloy in an amount, by weight, of from about 40 ppm to about 600 ppm; even more preferred of from about 40 ppm to about 500 ppm; yet more preferred of from about 50 ppm to about 400 ppm; even more preferred of from about 75 ppm to about 250 ppm; even more preferred of from about 100 ppm to about 200 ppm; and most preferred in an amount of about 200 ppm.

The amounts of bismuth and indium that are present in the alloy can vary widely, but each should be present in an amount to produce an amount of a bismuth-indium intermetallic compound sufficient to improve the gassing properties of the alloy. When it is said that the amount of the bismuth-indium intermetallic compound in the alloy should be sufficient to improve the gassing properties of the alloy, what is meant is that an anode produced from the novel alloy containing the bismuth-indium intermetallic will produce less gas in a gassing test under standard conditions than an anode produced from an alloy of the same composition, except not having the bismuth-indium intermetallic compound. The latter alloy may be termed the "conventional" alloy. It is preferred that the novel alloy produce at least about 10% less gas than the conventional alloy in the standard test, and more preferred that it produce at least about 50% less gas.

When bismuth, indium and a trace metal are present in the subject alloy, it is preferred that bismuth and indium are each present in an amount, by weight, of from about 50 ppm to about 10,000 ppm; that the trace metal is present in an amount of from about 40 ppm to about 600; and with the balance being primarily zinc. It is more preferred that bismuth and indium are each present in an amount, by weight of from about 100 ppm to about 5,000 ppm; and the trace metal is present in an amount of from about 40 ppm to about 500 ppm. It is even more preferred that bismuth and indium are each present in an amount, by weight of from about 200 ppm to about 1,000 ppm; and the trace metal is present in an amount of from about 50 ppm to about 400 ppm. It is most preferred that bismuth and indium are each present in an amount, by weight, of about 300 ppm and the trace metal is present in an amount of about 200 ppm, with zinc as the balance of the alloy.

When the metal components of the novel alloy have been added to the melting furnace, they are heated to a temperature of from about 450° C. to about 500° C.; preferably from about 480° C. and about 500° C.; and more preferably to about 500° C., and held at this temperature with mechanical mixing for a period of from about 10 min. to about 20 min. After such mixing, the components are believed to be homogeneously intermixed.

The molten zinc alloy can be solidified and produced in the form of a powder by conventional air atomization methods that are known in the art. Such methods are described, for example, by Lefebvre, A. H., *Atomization and Sprays*, Taylor and Francis, Bristol, Pa. (1989), and by Yule, A. J. and J. J. Dunkley, *Atomization of Melts*, Oxford University Press, New York (1994). One such preferred method that is known to result in a product having the desired characteristics is to transfer the molten alloy to an air atomizer by gravity flow and then to atomize the melt into solid particles having a nominal average diameter of, for example, about 190 micrometers by atomization with ambient temperature air. The powder granules are then collected in a collection bin.

Without wishing to be bound by this or any other theory, the inventors believe that the combination of the composition of the zinc alloy and the conditions that are used during the melting, mixing, air-atomization, solidification and cooling steps control the formation of zinc alloy powder particles having zinc crystalline grains that contact each other at intergrain boundaries. As described above, it is also believed that when bismuth and indium are present in the molten zinc in the amounts described above, they solidify into a BiIn intermetallic compound. It is thought that during solidification of the particle under suitable conditions this BiIn compound preferentially accumulates along the zinc intergrain boundaries and that it is the presence of the BiIn intermetallic compound that is related to the superior properties of the novel alloy.

The characteristics of the novel alloy that are described above can be measured by any suitable method, and one method that can be used is to prepare and view a sample of the alloy with a scanning electron microscope (SEM) that is fitted with an energy dispersive spectroscopy (EDS) analyzer. One system that can be used for this method is a JEOL model T330A scanning electron microscope with an EDS system composed of a Kevex SuperQuantum thin window detector connected to a 4 pi Spectral Engine II for acquisition of the spectra and with FLAME (fuzzy logic microanalysis engine) software from xk, Inc. for quantitative and qualitative analysis of the EDS data.

To prepare a sample of the alloy for analysis, a section of a powder particle, or any other alloy particle, is set in epoxy resin and polished to a standard of 0.05 microns. The polished surface is carbon-coated by methods that are well-known in the art, for viewing in the SEM. A sample of a BiIn standard of known composition and a sample of pure copper can be placed on the epoxy resin next to the test sample to be used as standards. The EDS analyzer is calibrated with the copper sample, and the SEM data acquisition software is standardized with the known BiIn standard sample.

The segregates that appear on the surface of the polished test sample are located by detection of back-scattered signal emissions, and the SEM is focused on different segregates, in turn, and the composition of the region of focus (about 1 micron-cubed) is measured and recorded. This is repeated for about 10 to about 20 segregates for each sample, in order to obtain a statistically valid measurement of the range of the composition of the segregates in the sample. The SEM software records the compositional analysis for each segregate measured and arranges the results in a data file.

The data file containing the compositional measurements for each segregate measured is exported to a spread-sheet program, such as, for example, Microsoft EXCEL. The data are arranged in a table having a bismuth (wt %) column and an indium (wt %) column and the data are sorted so as to obtain a list of the different bismuth (wt %) measurements in ascending order, along with the corresponding indium (wt %) measurements. One data file is obtained for each alloy sample that is analyzed. Each data file contains from about 12 to over 20 rows of data—each row corresponding to a measurement of composition of a separate segregate.

The resulting data file shows bismuth concentration measurements for the segregates in the alloy, from the lowest to the highest (and corresponding indium concentrations from the highest to the lowest). The average value of the Bi/In composition is calculated from all of the measurements in the data table and the standard deviation is also calculated. This is easily done by using the standard mathematical calculation tools of the spread-sheet program.

Thus, the SEM-EDS measurements can be used to identify segregates in the alloy; to identify the relative location of the segregates in the alloy; to measure the amount of the segregates that are located at the intergrain boundaries of the alloy; to identify the Bi/In composition ratio of each segregate (from which an average Bi/In composition of all segregates tested along with a standard deviation of such tested compositions can be calculated); and to determine the relative distribution of BiIn intermetallic compounds in segregates (in other words: the percentage of segregates that contain defined levels of BiIn intermetallic). In this manner, one of skill in the art can determine whether a zinc alloy meets the characteristics that are described for the novel alloy of the present invention.

The segregates that are formed in a zinc, bismuth, indium alloy can have widely varying composition, depending upon several parameters, which have been discussed above. As mentioned previously, it has been found that the more of the bismuth and indium in the segregates that is present in the form of a BiIn intermetallic, and in particular in the form of $BiIn_2$, the better are the gassing and discharge properties of the alloy when used as an electrode material. Thus, it is preferred that at least about 10% by weight of the total amount of bismuth and indium present in the alloy is present in the form of $BiIn_2$ intermetallic compound; more preferred that at least about 25% is $BiIn_2$; even more preferred that 50% is $BiIn_2$; yet more preferred that 75% is $BiIn_2$; and most preferred that substantially all of the total amount of bismuth and indium present in the alloy is $BiIn_2$.

Another method of expressing the composition of the segregates in an alloy sample is by defining the average Bi/In weight ratio of the segregates (calculated as described above) and stating the standard deviation. Since it is known that the Bi/In weight ratio for the three BiIn intermetallic compounds ranges from about 65/35 (actually 64.5/35.5) for BiIn to about 48/52 (actually 47.6/52.4) for $BiIn_2$, it can be assumed that a segregate having a Bi/In weight ratio within that preferred range contains 100% bismuth-indium intermetallic. As the Bi/In weight ratio varies outside of the preferred range—higher or lower—the segregate can be assumed to have less of the bismuth and indium present in the form of an intermetallic compound.

It is preferred that the average Bi/In weight ratio of the segregates in the novel alloy is between about 40/60 and about 70/30 and with a standard deviation of less than about 40; it is more preferred that the Bi/In weight ratio is between about 46/54 and about 65/35 and with a standard deviation of less than about 20; yet more preferred that the Bi/In weight ratio is between about 46/54 and about 50/50 and with a standard deviation of less than about 16; even more preferred that the Bi/In weight ratio is about 48/52 and with a standard deviation of less than about 10; and it is most preferred that the Bi/In weight ratio is about 48/52 and with a standard deviation of zero.

The novel zinc alloy can be formed into any useful shape. Powders, having a wide range of particle sizes, are useful for the manufacture of anodes for alkaline cell batteries. However, formation of the novel alloy into wires, bars, sheets, foils, ingots, molded and forged forms, and other forms or shapes is also easily done. Irrespective of the form given to the solid zinc alloy, it will have the composition that is described above. Moreover, it will have zinc intergrain boundaries at which are located some or most of the BiIn intermetallic compound.

Powders that are produced from the novel alloy can be used to form the anode for alkaline cell batteries by methods that are well known in the art. Batteries that use anodes comprising the novel alloy are likewise easily produced. When the novel alloy is used as an electrode in an alkaline cell battery, it is found that it achieves the advantage of providing an electrode that is substantially free of both mercury and lead and that the gassing properties of the battery are improved as well. Furthermore, the novel alloy provides a battery having the advantage of an improved discharge capacity.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

This example shows the benefit of a bismuth:indium weight ratio of 1:1 on the gassing properties of zinc alloys.

Zinc alloys were produced by melting special high grade (SHG) zinc (available from Big River Zinc Corporation, Sauget, Ill.) in a melting furnace and then adding to the molten zinc, bismuth (available from Metal Specialists, Fairfield, Conn.) and indium (available from Arconium, Providence, R.I.) in the amounts shown in Table 1. In all, five samples of zinc alloy were produced with each one having different levels of bismuth and indium, with the balance being zinc. After the metals were melted, the temperature was maintained at about 482° C. and the molten mixture was stirred with a mixing paddle until the mixture was substantially homogeneous.

Powders were then formed from the alloy by gravity flow of the molten metal at about 482° C. to a gravity-fed air atomizer for atomization of the molten alloy with ambient temperature air. The powder grains were collected in a holding bin and had an average nominal diameter of about 190 microns.

A weighed sample (10 g) of each of the zinc powders was placed in a separate plastic 100 ml Erlenmeyer flask and to each flask was added 100 ml of potassium hydroxide solution (45 wt. % solution in water, Aldrich Chemical Co., Milwaukee, Wis.) so that substantially no gas space was left in the flask. The flasks were then connected to an apparatus for measuring the volume of gas evolved from each flask while the flasks were held at a constant temperature of 71° C. The volume of gas generated by each flask was measured over a period of 24 hours and that volume was corrected to ambient temperature (25° C.) and ambient pressure and reported as milliliters of gas at ambient temperature and pressure per 5 grams of zinc powder per day. The results of the gassing tests for the five sample zinc powders having different levels of bismuth and indium is shown in Table 1. It is seen in Table 1 that the minimum amount of gas generation occurred with zinc alloy powders containing substantially the same weights of bismuth and indium. This was demonstrated at two levels, 300 ppm and 1000 ppm, each of bismuth and indium. Other samples having bismuth and indium present at different levels showed higher gas generation rates. This showed that zinc alloys having substantially equal amounts by weight of bismuth and indium provided gassing performance that was superior to zinc alloys having unequal amounts of bismuth and indium.

TABLE 1

Gas generation rate of zinc alloys having different levels of bismuth and indium.

| BISMUTH LEVEL (ppm) | INDIUM LEVEL (ppm) | GASSING (milliliters/5 g · day) |
| --- | --- | --- |
| 50 | 700 | 1.2 |
| 300 | 300 | 0.09 |
| 600 | 300 | 0.32 |
| 1000 | 1000 | 0.12 |
| 1500 | 300 | 0.40 |

EXAMPLE 2

This example shows the benefit of a bismuth:indium weight ratio of 1:1 on the discharge properties of zinc alloy powder.

Samples of the five zinc alloy powders that were produced as described in Example 1 were prepared for discharge capacity testing by producing a paste suitable for use as the anode in an alkaline cell battery. The preparation of such pastes is well known and is described by, among others, Shinoda et al., in U.S. Pat. No. 5,376,480. Zinc powder (66.4 parts by weight) of one of the five zinc alloy powder samples prepared as described in Example 1 was placed into the bowl of a paste mixer, such as a dough mixer or kitchen blender having all surfaces that contacted the paste coated with, or produced from a corrosion resistant polymer material. A commercial gelling agent (0.5–0.6 parts by weight) of the type conventionally used in the formulation of zinc powder anodes, such as a carboxyvinyl polymer—carboxypolymethylene, for example, or polyacrylic acid or the sodium salt thereof—was also placed in the mixer along with indium oxide (0.15 parts by weight) and mixed with the zinc powder for approximately 5–10 minutes. Potassium hydroxide saturated with 3% zinc oxide electrolyte (30.8 parts by weight) was then added to the materials in the mixer very slowly during operation of the mixer over a period of about 5–10 minutes. The paste was then mixed for 10 additional minutes; removed to a corrosion resistant plastic beaker; covered with plastic wrap and allowed to rest for 24 hours before discharge testing. This same procedure was used to prepare test pastes for each of the five zinc alloy powder samples to be tested.

Zinc anode paste containing one of the five test zinc alloy powders was used to produce a AA-size battery by filling a lined manganese oxide shell with the paste and inserting a brass pin to serve as the anode contact. The construction of such batteries is well known and is described, for example, in Japanese application disclosure Kokai H9-055207. The shell was then sealed and the test battery was connected to a power supply and discharged at a constant current flow of 2000 milliamps until it reached a voltage of 1.0 volt. When the voltage dropped below 1.0 volt, the time was noted and recorded as the discharge time, or discharge capacity, of the test battery. This procedure was repeated for paste produced from each of the five zinc alloy powder samples that had been prepared by the method of Example 1. Results of the discharge tests are shown in Table 2.

Table 2 indicates that the batteries composed of paste made from the zinc alloy powders having equal amounts of bismuth and indium provided discharge capacities that were superior to those of other zinc alloys in which the amounts of bismuth and indium were not substantially equal. This was true for two levels of bismuth and indium, namely 300 ppm and 1000 ppm each of the two metals. The discharge capacity of the zinc alloy having 1000 ppm each of bismuth and indium was slightly better than the discharge capacity of the zinc alloy with 300 ppm each of bismuth and indium. This showed that zinc alloys having substantially equal amounts by weight of bismuth and indium provided discharge capacity that was superior to zinc alloys having unequal amounts of bismuth and indium.

TABLE 2

Discharge capacity of cells with electrodes of zinc alloys having different levels of bismuth and indium.

| BISMUTH (ppm) | INDIUM (ppm) | DISCHARGE TIME (min. to 1.0 V at 2000 mA) |
| --- | --- | --- |
| 50 | 700 | 5.17 |
| 300 | 300 | 5.38 |
| 600 | 300 | 5.04 |
| 1000 | 1000 | 5.48 |
| 1500 | 300 | 4.85 |

EXAMPLE 3

This example shows the beneficial effect of adding magnesium at various levels to bismuth and indium on the gassing and discharge properties of zinc alloy.

Seven samples of zinc alloy powder were produced by the method described in Example 1. The seven samples were prepared with different levels of bismuth, indium and magnesium as shown in Table 3. Each of the samples was subjected to gassing tests as described in Example 1 and to discharge capacity tests as described in Example 2, except that discharge was done at a constant current of 730 milliamps rather than 2000 milliamps. The results of those tests are shown in Table 3.

The results show that the zinc alloys in which bismuth and indium were present in substantially equal amounts by weight gave superior gassing performance as shown in Example 1, with performance improving as the level of bismuth and indium increased from 100 ppm to 200 ppm and then to 300 ppm. However, the addition of magnesium, at a level of 200 ppm when bismuth and indium were each present at 300 ppm, improved the gassing performance of the zinc alloy almost 3-fold. The discharge times of all of the samples in which magnesium was present were all better than the discharge time of the one sample having no magnesium. It was seen that the zinc alloy having 300 ppm each of bismuth and indium and 200 ppm magnesium provided the best gassing and discharge performance of any of the samples.

TABLE 3

Gassing performance and discharge time for zinc-based electrode materials having different levels of bismuth, indium and magnesium.

| ZINC ALLOY[a] | COMPOSITION[b] (ppm) | GASSING (ml per day/5 g)[c] | DISCHARGE TIME[d] (min. to 1.0 V at 730 mA) |
| --- | --- | --- | --- |
| Bi/In | 300/300 | 0.28 | na |
| Bi/In | 250/250 | 0.38 | 43.08 |
| Bi/In | 100/100 | 1.73 | na |
| Bi/In/Mg | 300/300/200 | 0.09 | 46.18 |
| Bi/In/Mg | 1500/300/200 | 0.40 | 43.21 |
| Bi/In/Mg | 600/600/200 | 0.10 | 44.58 |
| Bi/In/Mg | 100/300/200 | 0.31 | 46.63 |

Notes:
[a]The zinc alloy is composed of zinc plus the metals shown, where Bi = bismuth, In = indium and Mg = magnesium.
[b]The content of each of the alloy metals identified in the left-hand column is given in parts per million by weight; the balance of the alloy is zinc.
[c]Gassing is measured for each of the alloys under substantially the same conditions as described in Example 1.
[d]Discharge time is measured for each of the alloys under substantially the same conditions as described in Example 2.

EXAMPLE 4

This shows a comparison of the gassing and discharge properties of commercial lead-alloy zinc powder versus powder composed of the novel zinc alloy.

A commercial lead-containing zinc alloy powder (available from Big River Zinc, Sauget, Ill.) and zinc alloy powder having a preferred composition of the present invention were subjected to gassing testing as described in Example 1 and to discharge capacity testing as described in Example 3. The results of the tests are shown in Table 4.

The results showed that the novel zinc alloy provided gassing properties and discharge properties that were both superior to those of the commercial lead-containing zinc powder.

TABLE 4

Gassing performance and discharge time for commercial lead-alloy zinc powder and zinc-based electrode powder containing bismuth, indium and magnesium.

| ZINC ALLOY[a] | COMPOSITION[b] (ppm) | GASSING (ml per day/5 g)[c] | DISCHARGE TIME[d] (min. to 0.9 V at 730 mA) |
|---|---|---|---|
| Pb[e] | 500 | 0.15 | 51.65 |
| Bi/In/Mg | 300/300/200 | 0.05 | 68.64 |

Notes:
[a]The zinc alloy is composed of zinc plus the metals shown, where Pb = lead, Bi = bismuth, In = indium and Mg = magnesium.
[b]The content of each of the alloy metals identified in the left-hand column is given in parts per million by weight; the balance of the alloy is zinc.
[c]Gassing is measured for each of the alloys under substantially the same conditions as described in Example 1.
[d]Discharge time is measured for each of the alloys under substantially the same conditions as described in Example 2, except that discharge is measured to 0.9 V.
[e]Commercial lead-containing zinc alloy powder is available from Big River Zinc, Sauget, IL.

EXAMPLE 5

This example shows that the bismuth/indium intermetallic compound is $BiIn_2$ and that the $BiIn_2$ is concentrated at zinc intergrain boundaries.

Scanning electron micrographs (SEM's) were taken of the cross-section of a powder grain that was formed from a zinc alloy having a composition of 300 ppm of bismuth, 300 ppm of indium, 200 ppm of magnesium and with the balance being zinc. The powder was produced by the method described in Example 1. The SEM's were taken with a JEOL model T330A scanning electron microscope at the magnification levels that are noted on the figures. FIG. 2 shows one SEM that shows that the majority of the sample comprises a number of roughly hexagonal crystalline grains of about 10 micron nominal size. The grains contact each other at intergrain boundaries along which are deposited a compound that has the appearance of beads or smaller, discrete particles. FIG. 3 shows another region of the same type of material where the SEM was taken at a higher magnification. In this photomicrograph darker crystallites dominate in area with a separate compound occupying the intergrain boundaries. However, here the intergrain material appears to be somewhat more continuous in its distribution along the intergrain boundary than shown in FIG. 2. However, it is believed that the material at the intergrain boundaries in FIG. 2 and FIG. 3 is the same material.

Energy dispersive spectroscopy (EDS) was used to determine the composition of two selected regions from the area shown in FIG. 2. The EDS system was composed of a Kevex SuperQuantum thin window detector connected to a 4 pi Spectral Engine II for acquisition of the spectra. The software used to quantitatively and qualitatively analyze the EDS data was called FLAME (fuzzy logic microanalysis engine) from xk, Inc. The location of the two selected regions and the corresponding EDS spectra are indicated on FIG. 2 by the black arrows. The spectra of the material in the intergrain boundary was found to be primarily composed of bismuth and indium in roughly equal amounts by mass. The spectra of the material in the center of the crystalline grain was found to be substantially pure zinc. It is believed that the small amount of zinc that was reported for the material in the intergrain boundary is an artifact caused by the limitation in the resolution of the SEM EDS of about 1 micron cubed. This small amount of reported zinc is believed to be the result of overlapping of the focal region onto some part of an adjoining crystalline region, rather than indicating that zinc is a component of the intergranular material.

Seven different SEM-EDS scans were made of the material occupying the intergrain boundary region. The results of the scans are shown in Table 5. The results of the spectroscopic determinations indicate that the composition of the material at the intergrain boundaries corresponds to the intermetallic compound $BiIn_2$.

TABLE 5

Composition of bismuth/indium intermetallic compound in seven samples of powder produced from the novel zinc alloy.

| SAMPLE NUMBER | BISMUTH CONTENT (wt %)[a] | INDIUM CONTENT (wt %)[a] |
|---|---|---|
| 1 | 44.40 | 55.60 |
| 2 | 44.72 | 55.28 |
| 3 | 44.88 | 55.12 |
| 4 | 45.38 | 54.62 |
| 5 | 45.53 | 54.47 |
| 6 | 46.29 | 53.71 |
| 7 | 52.53 | 47.47 |
| Standard Deviation | 2.84 | 2.84 |
| Average | 46.25 | 53.75 |

Notes:
[a]Bi and In compositions are determined from the number of counts of the respective element that is reported by energy dispersive spectroscopy of a segregated region of a powder grain cross-section that is limited to the material occupying the intergrain region. The respective number of counts of each element is used to derive the ratio of the two metals. Seven different scans were run on the material in the intergrain region.

EXAMPLE 6

This example shows the formation of a bismuth-indium intermetallic in bismuth/indium/zinc alloys and bismuth/indium/zinc alloys that also contain either calcium or aluminum and shows the superior gassing properties of the alloys.

Three bismuth-indium alloys were formed with zinc by the method described in Example 1. Alloys were formed having only bismuth/indium/zinc and also with bismuth/indium/calcium/zinc and bismuth/indium/aluminum/zinc. The compositions of the non-zinc metals in the three alloys was as follows (in ppm by weight): B/I=250/250; B/I/C=250/250/150; and B/I/A=200/200/100. Two samples were made of each alloy.

The characteristics of the segregates in each sample of the three alloys were measured. Each sample was prepared by embedding a section of an alloy particle in epoxy resin and polishing it to a standard of 0.05 microns. The polished surface was carbon-coated prior to viewing in the SEM. A sample of a BiIn standard of known composition and a sample of pure copper were placed on the epoxy resin next to the test sample to be used as standards. The EDS analyzer was calibrated with the copper sample, and the SEM data acquisition software is standardized with the known BiIn standard sample. The system used for the measurement was a JEOL model T330A scanning electron microscope with an EDS system composed of a Kevex SuperQuantum thin window detector connected to a 4 pi Spectral Engine II for acquisition of the spectra and with FLAME (fuzzy logic microanalysis engine) software from xk, Inc. for quantitative and qualitative analysis of the EDS data.

The EDS analysis was performed on at least about 12 of the segregates that were located in the sample. An EDS spectra corresponding to one of the measurements for each sample is shown in each of FIGS. 4(a) bismuth/indium/ calcium/zinc; (b) bismuth/indium/zinc; and (c) bismuth/indium/aluminum/zinc. The location of the target site of the spectra shown in FIG. 4(a) is indicated on the SEM micrograph by a circle with an arrow.

Figure 4A:
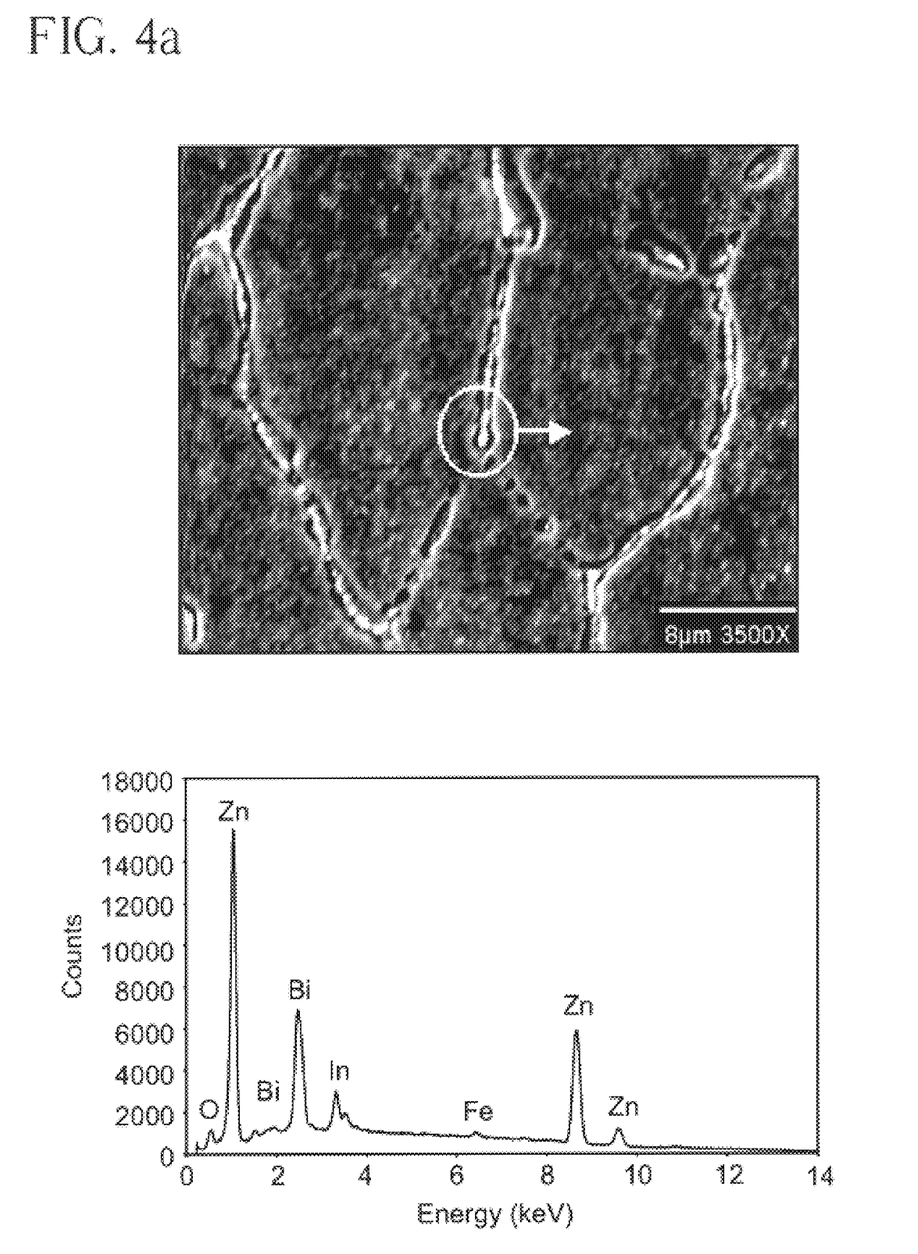
FIG. 4 shows scanning electron micrographs of cross-sections cut from solid alloys of (a) bismuth/indium/calcium/zinc; (b) bismuth/indium/zinc; and (c) bismuth/indium/aluminum/zinc, in accordance with this invention, where FIGS. 4(a) and 4(b) each show zinc crystalline grains that meet at intergrain boundaries along which are located bismuth/indium intermetallic segregates and all figures show bismuth/indium segregates and include an EDS spectra that corresponds to the composition of at least one of the segregates.
Figure 4B:
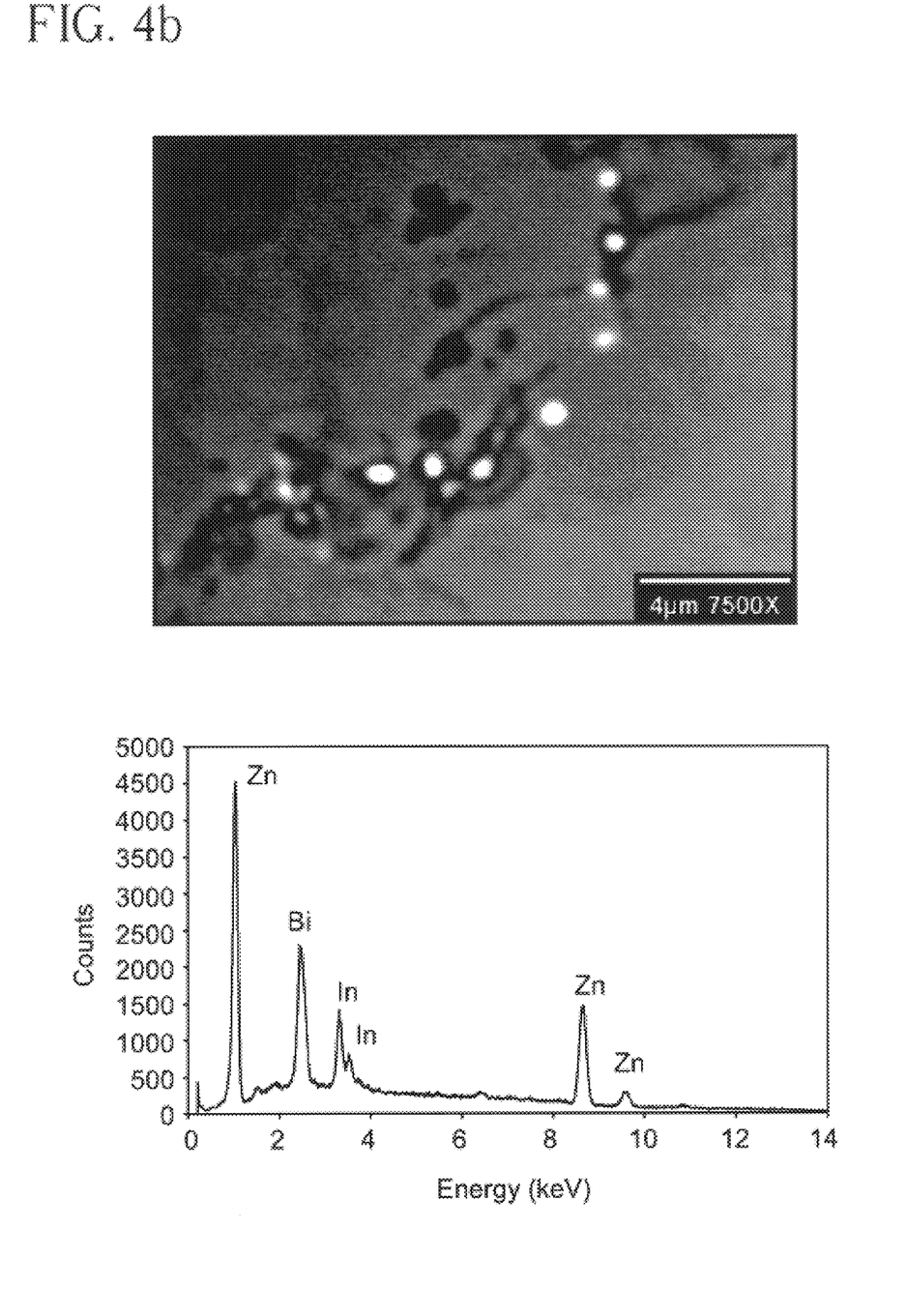
Figure 4C:
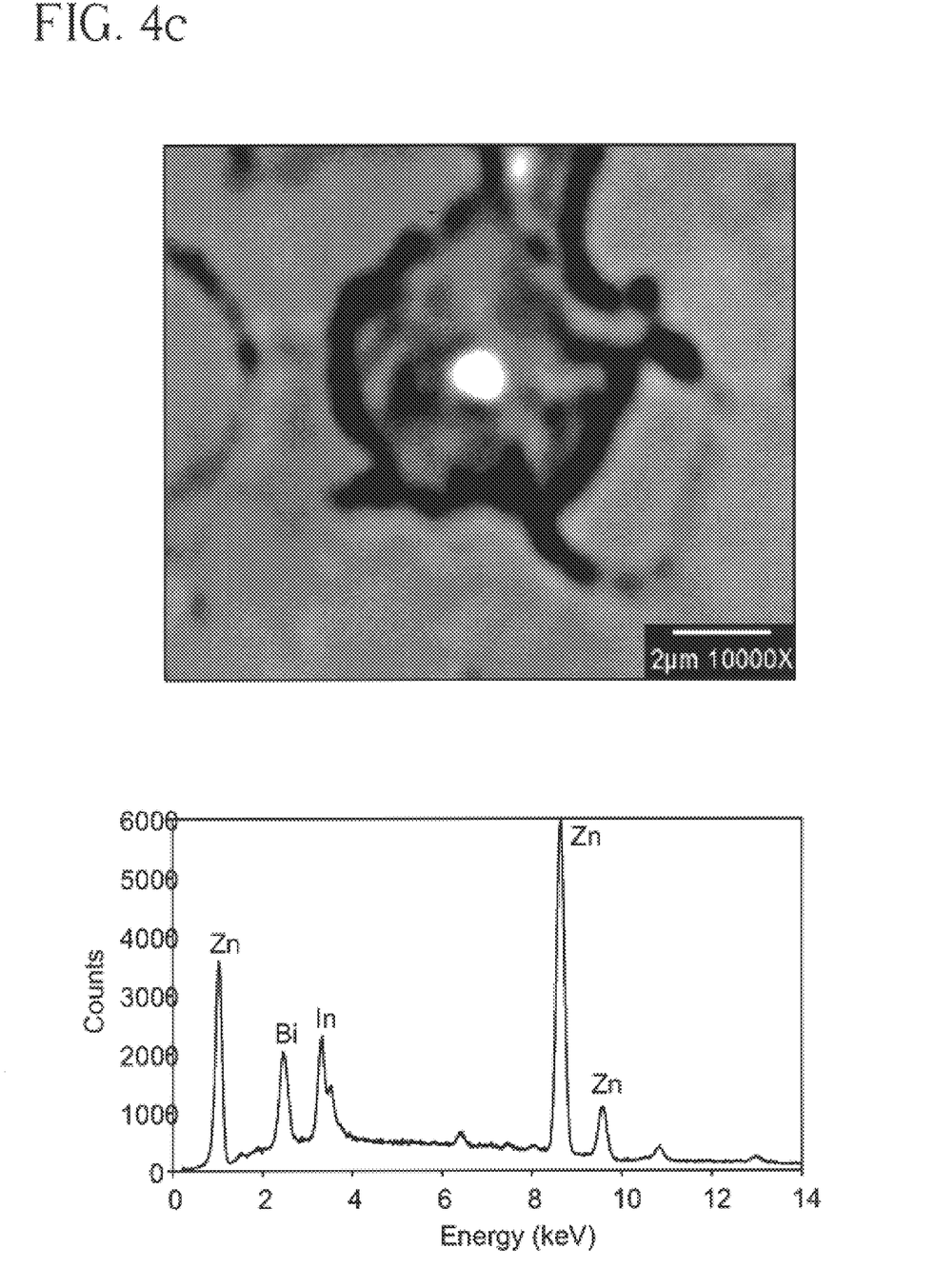

FIG. 4(a) clearly shows the main sections of two zinc crystallites in the center of the photomicrograph with the BiIn intermetallic segregates arranged along the intergrain boundaries. The segregates show up as bright inclusion bodies that are aligned along the intergrain regions. In FIG. 4(b), taken at a higher magnification, the bright intermetallic segregates can again be seen along a rough outline of what appears to be one part of a hexagonal zinc crystallite. The accompanying EDS spectra of one of the segregates shows the BiIn composition and also indicates that some zinc was also within the target region of the EDS spectra. FIG. 4(c) was taken at an even higher magnification and provides a less distinct image of the zinc alloy, but still indicates at least one or two bright intermetallic segregates. The accompanying EDS spectra shows the BiIn composition of one of the segregates.

The EDS data from each of the measurements was fed to a computer and entered into a Microsoft EXCEL spreadsheet table. Table 6 shows the results of EDS compositional measurements for 17 segregates located in the bismuth/indium/calcium/zinc alloy (FIG. 4(a)). The wt. % bismuth column has been sorted from lowest-to-highest and corresponding indium wt. % figures are shown. The readings have been grouped into three groups: low bismuth, medium bismuth, and high bismuth and the average level of bismuth (44.8% by weight) and indium (55.2% by weight) were calculated. The standard deviation for the data in the table was calculated as 36.9.

It can be seen that some segregates of pure indium and substantially pure bismuth were detected in the alloy, but that other segregates had the preferred Bi/In weight ratio of between about 40:60 to about 70:30.

TABLE 6

EDS analysis of segregates in bismuth/indium/calcium/zinc alloy powder.

| SEGREGATE NO. | BISMUTH LEVEL | BISMUTH (wt. %) | INDIUM (wt. %) |
|---|---|---|---|
| 1 | LOW | 0 | 100 |
| 2 | | 9.84 | 90.16 |
| 3 | | 10.24 | 89.76 |
| 4 | | 10.59 | 89.41 |
| 5 | | 10.66 | 89.34 |
| 6 | | 12.48 | 87.52 |
| 7 | | 13.29 | 86.71 |
| 8 | MEDIUM | 25.65 | 74.35 |
| 9 | | 37.88 | 62.12 |
| 10 | | 45.88 | 54.12 |
| 11 | | 53.65 | 46.35 |
| 12 | | 60.35 | 39.65 |
| 13 | HIGH | 89.86 | 10.14 |
| 14 | | 90.8 | 9.2 |
| 15 | | 93.63 | 6.37 |
| 16 | | 96.92 | 3.08 |
| 17 | | 99.58 | 0.42 |
| Standard Deviation (%) | | 36.9 | 36.9 |
| Average (%) | | 44.8 | 55.2 |

The gassing property of each of the three alloys was tested as described in Example 1. The gassing properties, Bi/In ratio of the segregates, and the standard deviation for the Bi/In composition are shown in Table 7.

TABLE 7

Properties of zinc powder containing BiIn intermetallic alloys.

BISMUTH/INDIUM/CALCIUM/ZINC ALLOY

| | B/I/C 1 | B/I/C/ 2 |
|---|---|---|
| Average Bi/In ratio of segregates by weight | 55/44 | 49/51 |
| Standard Deviation | 36.9 | 16.1 |
| Gassing (ml/5 g at 71° C.) | 0.97 | 0.13 |

BISMUTH/INDIUM/ALUMINUM/ZINC ALLOY

| | B/I/A 1 | B/I/A 2 |
|---|---|---|
| Average Bi/In ratio of segregates by weight | 43/57 | 49/51 |
| Standard Deviation | 11 | 4 |
| Gassing (ml/5 g at 71° C.) | 0.7 | 0.3 |

BISMUTH/INDIUM/ZINC ALLOY

| | B/I 1 | B/I 2 |
|---|---|---|
| Average Bi/In ratio of segregates by weight | 37/62 | 57/43 |
| Standard Deviation | 8 | 6 |
| Gassing (ml/5 g at 71° C.) | 0.38 | 0.2 |

The gassing data for the BIC and BIA alloys indicated that the closer the Bi/In weight ratio is to 48/52 (a Bi:In molar ratio of about 1:2) for the composition of the segregates, and the lower the standard deviation (i.e., the more of the intermetallic that is $BIn_2$), the better the gassing property of the alloy. Gassing properties of the BI alloy were also superior for both of the samples, even though neither sample had a Bi/In ratio that was close to 48/52. Sample B/I-2, which was slightly closer to the most preferred B/I ratio than B/I-1, had the better gassing properties of the two samples.

EXAMPLE 7

This example shows that a bismuth/indium/magnesium/zinc alloy that is substantially free of aluminum has superior gassing and discharge properties over the same alloy with aluminum and also shows that gassing and discharge properties vary according to the magnesium content.

Zinc alloys were prepared by the method described in Example 1, but with the content of the alloying metals as shown in Table 8, below. The gassing property of each of the alloy samples was tested by the method described in Example 1 and the discharge capacity of the samples was tested by the method described in Example 2.

TABLE 8

Gassing and discharge performance for bismuth/indium/magnesium zinc alloy having different levels of magnesium and compared with bismuth/indium/magnesium/aluminum zinc alloy.

| ZINC ALLOY[a] | COMPOSITION[b] (ppm) | GASSING (ml/5 g per day)[c] | DISCHARGE TIME[d] (min. to 1.0 V at 730 mA) |
|---|---|---|---|
| Bi/In/Mg | 300/300/50 | 0.02 | 43.91 |
| Bi/In/Mg | 300/300/200 | 0.09 | 46.18 |

TABLE 8-continued

Gassing and discharge performance for bismuth/indium/magnesium zinc alloy having different levels of magnesium and compared with bismuth/indium/magnesium/aluminum zinc alloy.

| ZINC ALLOY[a] | COMPOSITION[b] (ppm) | GASSING (ml/5 g per day)[c] | DISCHARGE TIME[d] (min. to 1.0 V at 730 mA) |
|---|---|---|---|
| Bi/In/Mg/Al | 300/300/200/200 | 0.60 | 43.34 |
| Bi/In/Mg | 300/300/500 | 0.30 | 44.31 |

Notes:
[a]The zinc alloy is composed of zinc plus the metals shown, where Bi = bismuth, In = indium, Mg = magnesium, and Al = aluminum.
[b]The content of each of the alloy metals identified in the left-hand column is given in parts per million by weight; the balance of the alloy is zinc.
[c]Gassing is measured for each of the alloys under substantially the same conditions as described in Example 1.
[d]Discharge time is measured for each of the alloys under substantially the same conditions as described in Example 2.

The data show that the presence of aluminum at the level of 200 ppm in a bismuth/indium/magnesium (BIM) alloy of zinc results in a significant increase in the gassing properties and a significant decrease in the discharge capacity compared with a zinc alloy having the same composition except being substantially free of aluminum. It should be noted that a difference of almost 3 minutes in discharge capacity is considered to be a large difference in this type of test. Furthermore, the gassing properties of the BIM zinc alloy that contained aluminum was over 6-fold higher than gassing from the comparable BIM alloy that was free of aluminum. This indicates the advantages in both gassing and discharge properties that can be obtained by using a BIM zinc alloy that is substantially free of aluminum.

The data of Table 8 also show the effect of varying levels of magnesium on the gassing and discharge properties of zinc alloys where bismuth and indium are held constant and the alloy is substantially free of aluminum. Although the alloys that contain 50 and 200 ppm of magnesium both performed with very low gassing, the sample having 50 ppm gave the lowest gassing value of all. The sample having 500 ppm gave a higher gassing value and showed that BIM zinc alloys having higher levels of magnesium (i.e., over about 400 ppm of Mg) provide poorer gassing performance than alloys having magnesium levels between about 50 ppm and about 400 ppm. However, gassing level of the alloy is not the only consideration and the discharge capacity of the alloy is also important. It can be seen that the alloy having 50 ppm provides the lowest discharge capacity while the alloy having 200 ppm magnesium provides the highest (and best) discharge capacity. The sample having 500 ppm magnesium is intermediate between those two. Thus, the 300/300/200 Bi/In/Mg alloy is again seen to provide an advantageous balance of gassing properties and discharge capacity.

EXAMPLE 8

This example illustrates the superior gassing properties of bismuth/indium/zinc alloys that contain BiIn intermetallic compound over alloys having the same composition, but having a lower amount of the intermetallic compound.

In this example, two sets of alloys having the same composition were prepared. One set of alloys was a bismuth/indium/magnesium/zinc alloy (BIM alloy), and the other was a bismuth/indium/calcium/zinc alloy (BIC alloy). All of the alloys were prepared by air atomization methods that are common and well-known in the art, but there was no effort made to control the conditions of the processes to maximize the amount of BiIn intermetallic compounds that were formed in the alloys. The content of BiIn intermetallic compound that was present in the segregates varied between samples. Two samples of each of two alloys were prepared.

Two samples of a bismuth/indium/magnesium/zinc alloy were prepared. The composition of both samples of the alloy was 300/300/200 bismuth/indium/magnesium/zinc (the numbers refer to the ppm by weight of the respective bismuth/indium/magnesium metals in the alloy).

The gassing property of each of the alloy samples was tested by the method described in Example 1 and the Bi/In intermetallic compound contents of the segregates was determined by the methods described in Example 5. The data for the segregate composition and for the gassing data for the two alloys is shown in Table 9, below.

TABLE 9

Composition and gassing data for 300/300/200 bismuth/indium/magnesium/zinc alloys containing differing amounts of BiIn intermetallic compound.

|  | B/I/M - 1 | B/I/M - 2 |
|---|---|---|
| Percent of segregates having 100% of BiIn present as intermetallic[a] | 67% | 71% |
| Percent of segregates having 95%–99% of BiIn present as intermetallic | 6% | 29% |
| Percent of segregates having 85%–94% of BiIn present as intermetallic | 20% | 0% |
| Percent of segregates having 50%–84% of BiIn present as intermetallic | 7% | 0% |
| Percent of segregates having 0%–49% of BiIn present as intermetallic | 0% | 0% |
| Gassing (ml/5 g at 71° C. for 24 hrs.) | 0.13 | 0.05 |

Notes:
[a]The amount of the Bi and In content of a segregate that is present as an intermetallic is the total of BiIn, $BiIn_2$ and $Bi_3In_5$ content.

From Table 9, it can be seen that the segregates of sample B/I/M-2 contained bismuth and indium intermetallic compounds in higher levels than did the segregates of sample B/I/M-1. For example, all of the segregates of sample BIM-2 contained at least 95% of a BiIn intermetallic, whereas only 73% of the segregates of sample BIM-1 contained at least 95% of a BiIn intermetallic. As can be seen from the gassing data, the B/I/M-2 sample had superior properties and generated less than one-half as much gas as did the sample having a lower level of intermetallic in the segregates. This showed that between alloys having the same composition, the sample having a higher level of BiIn intermetallic compound provide superior performance.

Two samples of a bismuth/indium/calcium/zinc alloy were prepared. The composition of both samples of the alloy was 250/250/150 bismuth/indium/calcium/zinc (the numbers refer to the ppm by weight of the respective bismuth/indium/calcium metals in the alloy).

The gassing property of each of the alloy samples was tested by the method described in Example 1 and the Bi/In intermetallic compound contents of the segregates was determined by the methods described in Example 5. The data for the segregate composition and for the gassing data for the two alloys is shown in Table 10, below.

TABLE 10

Composition and gassing data for 250/250/150 bismuth/indium/calcium/zinc alloys containing differing amounts of BiIn intermetallic compound.

|  | B/I/C - 1 | B/I/C - 2 |
|---|---|---|
| Percent of segregates having 100% of BiIn present as intermetallic[a] | 37% | 18% |
| Percent of segregates having 95%–99% of BiIn present as intermetallic | 32% | 6% |
| Percent of segregates having 85%–94% of BiIn | 0% | 0% |

TABLE 10-continued

Composition and gassing data for 250/250/150 bismuth/indium/calcium/zinc alloys containing differing amounts of BiIn intermetallic compound.

|  | B/I/C - 1 | B/I/C - 2 |
|---|---|---|
| present as intermetallic |  |  |
| Percent of segregates having 50%–84% of BiIn present as intermetallic | 10% | 47% |
| Percent of segregates having 0%–49% of BiIn present as intermetallic | 21% | 29% |
| Gassing (ml/5 g at 71° C. for 24 hrs.) | 0.20 | 0.65 |

Notes:
[a] The amount of the Bi and In content of a segregate that is present as an intermetallic is the total of BiIn, BiIn$_2$ and Bi$_3$In$_5$ content.

From Table 10, it can be seen that the segregates of sample B/I/C-1 contained bismuth and indium intermetallic compounds in higher levels than did the segregates of sample B/I/C-2. For example, over two-thirds (69%) of the segregates of sample BIC-1 contained at least 95% of a BiIn intermetallic, whereas only 24% of the segregates of sample BIC-2 contained at least 95% of a BiIn intermetallic. As can be seen from the gassing data, the B/i/C-1 sample had superior properties and generated less than one-third as much gas as did the sample having a lower level of intermetallic in the segregates. This showed that between alloys having the same composition, the sample having a higher level of BiIn intermetallic compound provide superior performance.

EXAMPLE 9

This example illustrates the superior gassing properties of a bismuth/indium/zinc alloy having higher BiIn intermetallic content compared with an alloy having the same overall composition, but that was prepared by a different method and has a lower content of BiIn intermetallic compound.

Two samples of a bismuth/indium/magnesium/zinc alloy were prepared. The composition of both samples of the alloy was 300/300/200 bismuth/indium/magnesium/zinc (the numbers refer to the ppm by weight of the respective bismuth/indium/magnesium metals in the alloy). One of the samples of the alloy (the sample numbered BIM-1) was prepared by the method described in Example 1; namely, by atomization of a well-mixed 482° C. melt by a gravity-fed, air atomizer with the powder falling into a collection bin. The other sample (numbered BIM-2) was prepared by atomization by a vertically upwards atomizer (which operates by creating a vacuum to suck the molten metal up through the center of the atomizing nozzle while air is blown through the nozzle surrounding the molten metal, thus providing that the air and the metal travel through the atomizer in the same direction).

The gassing property of each of the alloy samples was tested by the method described in Example 1 and the bismuth/indium composition of the segregates was determined by the methods described in Example 5. The data for the two sample alloys is shown in Table 11, below.

TABLE 11

Composition and gassing data for 300/300/200 bismuth/indium/magnesium/zinc alloys containing differing amounts of BiIn intermetallic compound.

|  | B/I/M - 1 | B/I/M - 2 |
|---|---|---|
| Percent of segregates having 100% of BiIn present as intermetallic[a] | 71% | 31% |
| Percent of segregates having 95%–99% of BiIn present as intermetallic | 29% | 23% |
| Percent of segregates having 85%–94% of BiIn present as intermetallic | 0% | 31% |
| Percent of segregates having 50%–84% of BiIn present as intermetallic | 0% | 15% |
| Percent of segregates having 0%–49% of BiIn present as intermetallic | 0% | 0% |
| Gassing (ml/5 g at 71° C. for 24 hrs.) | 0.05 | 1.20 |

Notes:
[a] The amount of the Bi and In content of a segregate that is present as an intermetallic is the total of BiIn, BiIn$_2$ and Bi$_3$In$_5$ content.

From Table 11, it can be seen that the segregates of sample B/I/M-1 (the alloy prepared according to the method described in Example 1) contained higher levels of a bismuth and indium intermetallic compound that did the segregates of sample B/I/M-2. As can be seen from the gassing data, the B/I/M-1 sample bad superior properties and generated less than 5% of the gas generated by the sample having a lower level of intermetallic in the segregates. This showed that between alloys having the same composition, the sample having a higher level of BiIn intermetallic compound provides superior gassing performance.

All references, including, for example, patents, published patent applications, texts, manuscripts, articles and the like, that are cited in this specification are hereby incorporated by reference. The discussion of these references herein is intended merely to summarize the assertions made by their authors and no admission is made that any reference constitutes prior art. Applicants reserve the right to challenge the accuracy and pertinence of the cited references.

In view of the above, it will be seen that the several advantages of the invention are achieved and other advantageous results obtained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. A zinc alloy for use in batteries and having improved gassing properties, the alloy comprising a bismuth-indium (BiIn) intermetallic compound in an amount sufficient to improve the gassing properties of the alloy; and with the major part of the alloy being zinc that is substantially free of lead and mercury.

2. A zinc alloy for use in batteries and having improved gassing properties, the alloy comprising a bismuth-indium (BiIn) intermetallic compound in an amount sufficient to improve the gassing properties of the alloy; at least some of the BiIn intermetallic compound being present in the form of segregates and with the major part of the alloy being zinc that is substantially free of lead and mercury.

3. A zinc alloy for use in batteries and having improved gassing properties, the zinc alloy having zinc intergrain boundaries and comprising a bismuth-indium (BiIn) intermetallic compound in an amount sufficient to improve the gassing properties of the alloy; at least some of the BiIn intermetallic compound being present in the form of segregates located at the zinc intergrain boundaries, and with the major part of the alloy being zinc that is substantially free of lead and mercury.

4. The zinc alloy of claim 3, wherein the BiIn intermetallic compound is present predominantly in the form of segregates.

5. The zinc alloy of claim 3, wherein the BiIn intermetallic compound is selected from the group consisting of BiIn, BiIn$_2$, Bi$_3$In$_5$, and mixtures thereof.

6. The zinc alloy of claim 5, wherein the average Bi/In weight ratio of the intermetallic segregates is between about 40/60 and about 70/30 and with a standard deviation of less than about 40.

7. The zinc alloy of claim 6, wherein the average Bi/In weight ratio of the intermetallic segregates is between about 46/54 and about 65/35 and with a standard deviation of less than about 20.

8. The zinc alloy of claim 7, wherein the average Bi/In weight ratio of the intermetallic segregates is between about 46/54 and about 50/50 and with a standard deviation of less than about 16.

9. The zinc alloy of claim 8, wherein the average Bi/In weight ratio of the intermetallic segregates is about 48/52 and with a standard deviation of less than about 10.

10. The zinc alloy of claim 9, wherein the average Bi/In weight ratio of the intermetallic segregates is about 48/52 and with a standard deviation of zero.

11. The zinc alloy of claim 3 wherein the zinc alloy further comprises an element selected from the group consisting of magnesium, calcium and aluminum.

12. The zinc alloy of claim 5, wherein the alloy comprises bismuth and indium in a weight ratio of from about 40:60 to about 70:30; and with the major part being zinc that is substantially free of lead and mercury.

13. The zinc alloy of claim 12, wherein the weight ratio of bismuth to indium is from about 40:60 to about 70:30.

14. The zinc alloy of claim 13, wherein the weight ratio of bismuth to indium is from about 45:55 to about 68:32.

15. The zinc alloy of claim 14, wherein the weight ratio of bismuth to indium is from about 48:52 to about 65:35.

16. The zinc alloy of claim 5, wherein the bismuth and indium are present in a molar ratio of about 1:2; and with the balance being zinc that is substantially free of lead and mercury.

17. The zinc alloy of claim 16, wherein the bismuth and indium are present in approximately equal amounts by weight.

18. The zinc alloy of claim 17, wherein the weight ratio of bismuth to indium is from about 46:54 to about 50:50.

19. The zinc alloy of claim 18, wherein the weight ratio of bismuth to indium is about 48:52.

20. The zinc alloy of claim 11, wherein the bismuth and indium are each present in an amount of from about 50 to about 10,000 ppm, by weight.

21. The zinc alloy of claim 20, wherein the bismuth and indium are each present in an amount of from about 100 to about 5,000 ppm, by weight.

22. The zinc alloy of claim 21, wherein the bismuth and indium are each present in an amount of from about 200 to about 1000 ppm, by weight.

23. The zinc alloy of claim 22, wherein the bismuth and indium are each present in an amount of about 300 ppm, by weight.

24. The zinc alloy of claim 11, wherein the bismuth and indium are each present in an amount of from about 50 to about 10,000 ppm, by weight and the element selected from the group consisting of magnesium, calcium and aluminum is present in an amount of from about 40 ppm to about 600 ppm, by weight.

25. The zinc alloy of claim 24, wherein the bismuth and indium are each present in an amount of from about 100 to about 5000 ppm, by weight and the element selected from the group consisting of magnesium, calcium and aluminum is present in an amount of from about 40 ppm to about 500 ppm, by weight.

26. The zinc alloy of claim 25, wherein the bismuth and indium are each present in an amount of from about 200 to about 1000 ppm, by weight and the element selected from the group consisting of magnesium, calcium and aluminum is present in an amount of from about 50 ppm to about 400 ppm, by weight.

27. The zinc alloy of claim 26, wherein the bismuth and indium are each present in an amount of from about 200 to about 1000 ppm, by weight and the element selected from the group consisting of magnesium, calcium and aluminum is present in an amount of from about 75 ppm to about 250 ppm, by weight.

28. The zinc alloy of claim 27, wherein magnesium is present in an amount of about 200 ppm by weight.

29. The zinc alloy of claim 26 wherein the bismuth and indium are each present in an amount of about 300 ppm, by weight and the element selected from the group consisting of magnesium, calcium and aluminum is magnesium and said magnesium is present in an amount of from about 100 ppm to about 200 ppm.

30. The zinc alloy according to claim 3 wherein the majority of the segregates are predominantly a Bi In intermetallic.

31. The zinc alloy according to claim 3 wherein in at least 67% of the segregates, 100% of the Bi and In are present as a Bi In intermetallic.

32. The zinc alloy according to claim 3 wherein in at least 73% of the segregates, at least 95% of the Bi and In are present as Bi In intermetallic.

33. The zinc alloy according to claim 3 wherein in substantially all of the segregates, at least 95% of the Bi and In are present as a Bi In intermetallic.

34. The zinc alloy according to claim 3 wherein in at least 71% of the segregates, 100% of the Bi and In are present an a Bi In intermetallic.

35. The zinc alloy according to claim 3 wherein in at least 69% of the segregates, at least 95% of the Bi and In are present as a Bi In intermetallic.

36. The zinc alloy according to claim 3 herein in at least 37% of the segregates, 100% of the Bi and In are present as Bi In intermetallic.

* * * * *